United States Patent [19]

Petitjean et al.

[11] Patent Number: 4,679,729

[45] Date of Patent: Jul. 14, 1987

[54] APPARATUS AND METHOD FOR REGULATING FLOW AND TEMPERATURE IN A CENTRAL HEATING INSTALLATION

[75] Inventors: Robert Petitjean, Limal, Belgium; Bo G. Eriksson, Borås, Sweden

[73] Assignee: Tour & Andersson AB, Johanneshov, Sweden

[21] Appl. No.: 853,470

[22] Filed: Apr. 18, 1986

[30] Foreign Application Priority Data

Apr. 29, 1985 [SE] Sweden .............................. 8502062-6

[51] Int. Cl.$^4$ ............................................. F24D 3/00
[52] U.S. Cl. .................................... 237/8 R; 236/91 F
[58] Field of Search ..................... 237/8 R, 8 C, 56; 236/91 F, 9 A

[56] References Cited

U.S. PATENT DOCUMENTS 2,560,282 7/1951 Geisseler ............................. 237/8 R
2,781,174 2/1957 Smith .................................. 237/8 R Primary Examiner—Henry Bennett
Attorney, Agent, or Firm—Hayes, Davis & Soloway

[57] ABSTRACT

A method and apparatus for regulating the flow and the temperature in a central heating installation including a heating circuit having a feed pipe (28), one inlet control and distributing unit (38), a plurality of heating coils (40, 40', 40''), one collecting unit (42) and a return pipe (24) with a circulation pump (25). The unit (38) comprises an inlet chamber (44) with an outlet for the respective coil, valves (46, 46', 46'') for temperature control, one mixing chamber (48) with inlet tubes (58, 58', 58'') from the inlet chamber (44) and outlet tubes (60, 60', 60'') to the respective coils with temperature transmitters (50, 50', 50''). The inlet tubes project into the outlet tubes with intermediate gaps (61). From the return pipe a portion of the return water is recirculated to the mixing chamber (48) and via the gaps (61) into the outlet tubes.

10 Claims, 2 Drawing Figures

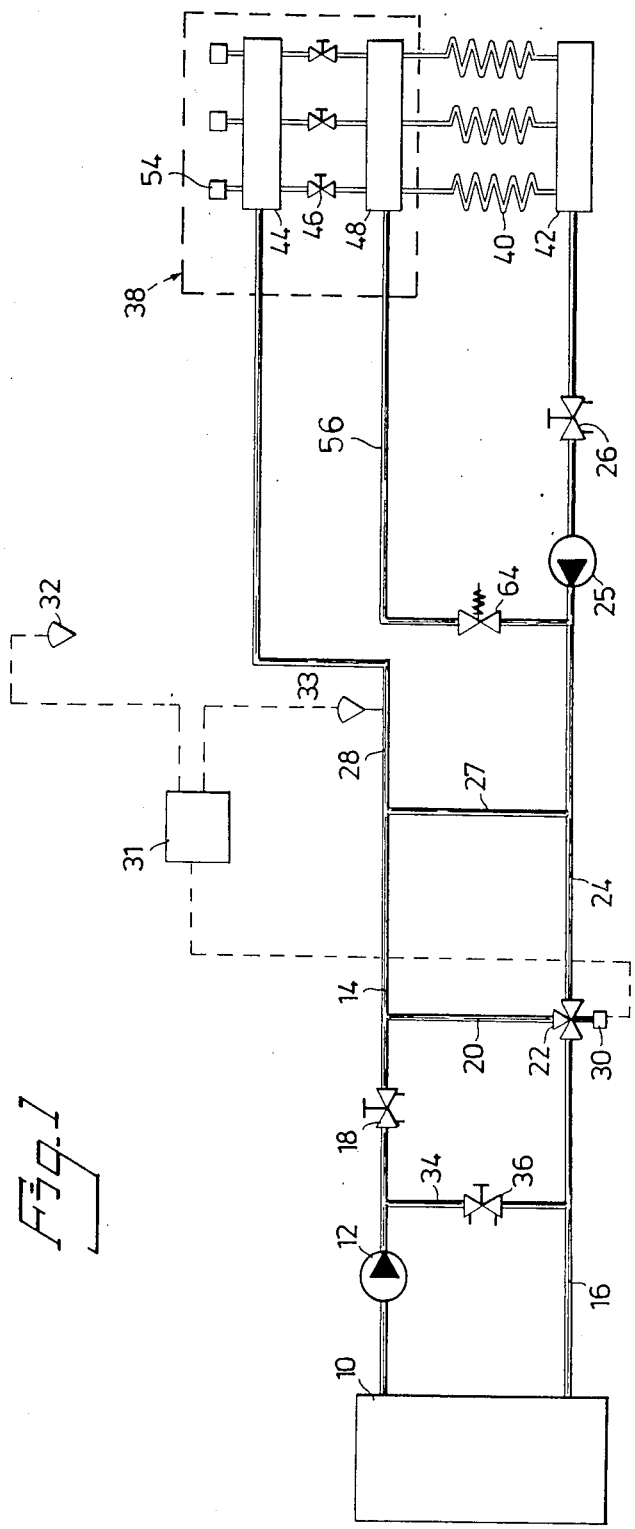

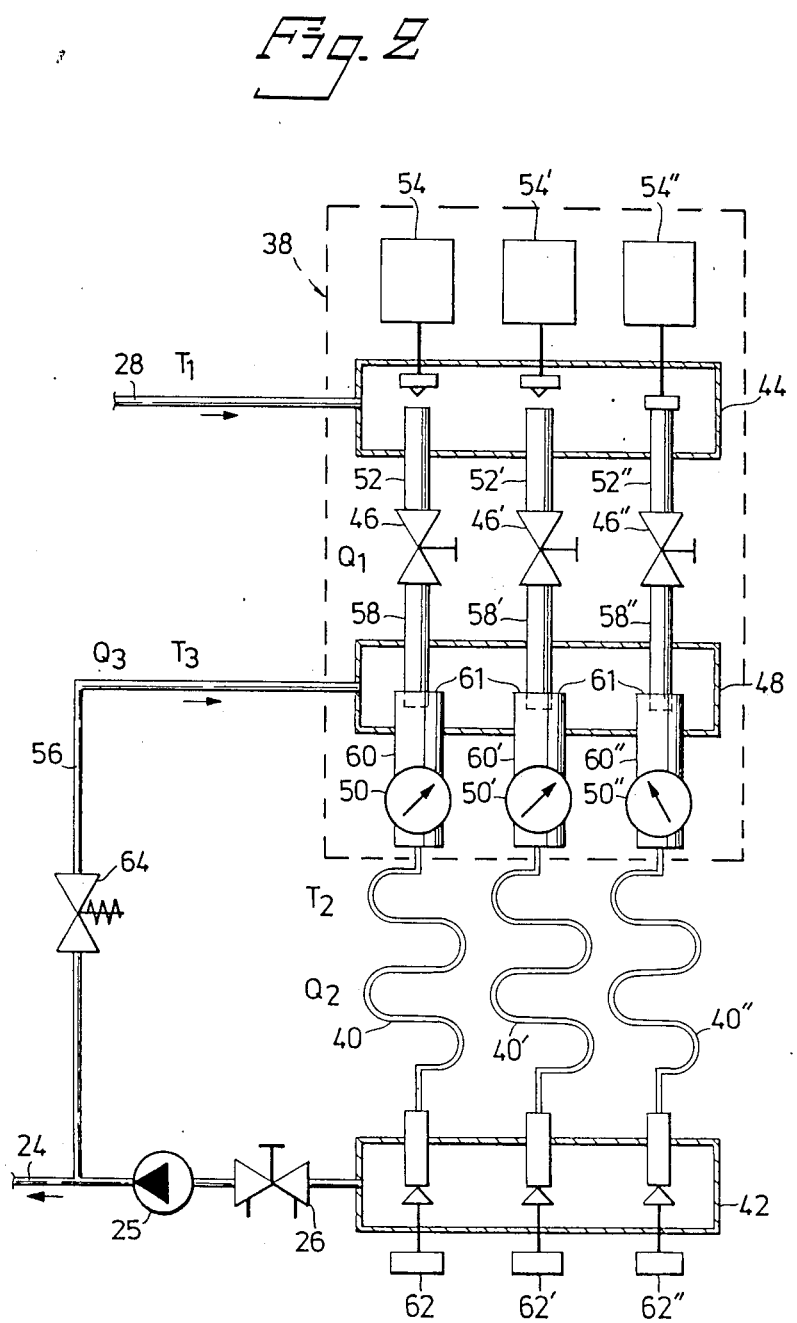

和679,729

APPARATUS AND METHOD FOR REGULATING FLOW AND TEMPERATURE IN A CENTRAL HEATING INSTALLATION

The present invention relates to an apparatus and method for regulating the flow and the temperature respectively in a central heating installation, particularly, though not exclusively of the kind having a feed pipe from a heat source, at least one heating circuit comprising a control and distributing unit with an inlet chamber or distributor provided with a plurality of outlets, a plurality of heating coils issuing from said inlet chamber, a collecting unit for said coils, a return water pipe to the heat source, water circulation means and water transfer means for the transfer of a part of the return water flow to the inlet side of the heating coils, the flow volume in the separate coils being limited by means of valves.

The invention is particularly, though not exclusively, designed to be applied to floor heating installations. A floor heating installation includes a plurality of heating coils in the floors of the rooms. The heating coils heat the floor itself and the floor in its turn the room.

The temperature regulation of a room having a floor heating installation involves particlar difficulties. Due to the large quantity of material to be heated or cooled in the floors, the heating system has a large inertia. An adjustment of the room temperature by means of thermostat valves, e.g. will function in the following manner. When the room is heated by an additional amount of heat, e.g. from the sun, the thermostat valve will shut off the warm water flow in the feed pipe. The floor will, however, despite the closing, still heat the rooms during a considerable time period thereafter and this results in an undesired overheating of the room. When the extra amount of heat, e.g. from the sun, then disappears and the thermostat valve is opened anew, the floor may be completely chilled down. It will take a long time then before the floor heating system heats the room and the room temperature is lowered below what is desired for a long time thereafter.

Customarily, a floor heating system includes a control and distributing unit, from which a plurality of heating coils issue. Each ordinarily serves one room. In such a distributing unit the feed pipe temperature must be sufficiently high to satisfy the heating need of the most energy consuming of the outgoing heating coils. This heating need is determined by several factors, i.e. the specific heat losses of the room, the size of the room, the desired temperature in the room and the k-value of the floor covering. However, this required feed pipe temperature results in a temperature which is too high in rooms having the rest of the coils, where the heat need is less and/or the desired room temperature is lower. Customarily, the problem is solved by a checking of the flow and/or an increased tube distance, depending on the heating need in the rest of the heating coils. The inlet temperature is the same in all the heating coils. When the flow is smaller, the temperature gradient in the coils is larger and this results in an unbalanced heat emission along the coil. Also, each coil can be controlled by a room temperature transmitter, which by means of a valve shuts off the flow, when the room temperature is too high, e.g. due to solar influx. This results in the slow reaction effects and the temperature fluctuations described above.

According to another solution of the present problem three-way valves are provided, where each heating coil starts for the respective room. One inlet of the three-way valve is connected to the feed pipe from the heat source. In the return pipe from the separate coils a pump is mounted. From this pump a return pipe leads to the heater and a recirculation pipe is provided. The recirculation pipe is connected to the second inlet of the different three-way valves. The adjustment of the three-way valves is monitored individually by means of some type of adjustment means and room temperature transmitters. By means of this device an individual feed pipe temperature for each room depending on the heat need can be obtained. Also, uniformly heated floors are obtained as a result of a continuous, mainly constant water circulation. Also, due to a lowering of the feed pipe temperature a cooling of the floor can be obtained. By that the afterheating effect described above is neutralized. Simultaneously, a heat recovery from the heated floor is attained.

However, this system having three-way valves has several drawbacks. The piping is more expensive and more complicated, since double feed pipes to each room are required. The three-way valves and their adjustment means are expensive components, which elevate the total cost of the installation. Also, it is difficult to control and balance them. Also, they may be subjected to breakdowns, resulting in a seizure of the valve and the same not being able to shift or only being able to shift in a limited interval. Owing to this, the temperature regulation is not functioning and the water temperature cannot be regulated or can only be regulated within a limited interval. This is the reason why the use of three-way valves ought to be limited to those instances, where they are absolutely inevitable and then expensive and more reliable valves are put into service.

DE-B 2 750 026 describes a heating circuit being a part of a central heating installation of the kind described above. A part of the return water flow is transferred to the feed pipe in order to attain a required, common feed water temperature, which is sensed by a transmitter on the distributing unit. In the individual heating coils only the flow rate is regulated and not the incoming water temperature.

DE-A 2 556 823 describes a central heating system with heating coils, in which the temperature of the outgoing water from the respective heating coil is maintained constant. A temperature transmitter at the outlet end of each heating coil is regulating a valve at the inlet end. In order to maintain a sufficient flow in the entire heating system there is provided a by-pass pipe provided with a so-called "self-acting valve", which maintains a constant pressure difference between the inlet and an outlet end of the heating coils.

EP-A 0 099 295 describes also a central heating installation substantially of the same kind as the one described in DE-A 2 556 823. Also in this case, the installation is provided with a by-pass pipe with a "self-acting valve" in order to transmit a by-pass flow, when there is a high pressure drop over the heating coils. However, this publication is mainly related to the control of the common feed water temperature.

All the previously known central heating installations have in common, that the feed water temperature is the same in all heating coils issuing from a feed pipe or distributing unit. The regulation of temperature in the various rooms served by the heating coils is made by limiting the flow rate in the corresponding heating coils. This has several disadvantages, as explained above.

Thus an object of the present invention is to develop a method of separately regulating the flow and the temperature respectively in a central heating installation, which affords an individual regulation of the feed temperature in each coil, which issues from a control and distributing unit common to several coils and also allows a continuous and mainly constant liquid circulation in each coil. Another object of the invention is to develop a means to carry out said method.

According to the invention, there is provided a method of regulating the flow and the temperature in a central heating installation, including a feed water pipe (14, 28) from a heat source (10), a heating circuit comprising a control and distributing unit (38) having an inlet chamber (44) connected to the feed pipe and provided with a plurality of outlets, a plurality of heating coils (40, 40', 40") issuing from said inlet chamber by way of said outlets, a collecting unit (42) for said coils, a return water pipe (24, 16) for returning water from the coils to the heat source (10), water circulating means (12, 25), water transfer means (27) for the transfer of a part of the return water flow to the inlet side of the heating coils (40, 40', 40"), flow volume in the separate coils being limited by means of valves (54, 54', 54", 62, 62', 62"), wherein a portion of the return water is returned to a mixing chamber (48) arranged downstreams of the inlet chamber between the inlet chamber and the coils and the inlet temperature in each coil (40, 40', 40") is adjusted separately.

Also according to the invention, there is provided apparatus for regulating the flow and the temperature in a central heating installation comprising a feed water pipe (14, 28) from a heat source (10), a heating circuit comprising a control and distributing unit (38) having an inlet chamber (44) connected to the feed pipe and provided with a plurality of outlets, a plurality of heating coils (40, 40', 40") issuing from said inlet chamber by way of said outlets, a collecting unit (42) for said coils, a return water pipe (24, 16) for returning water from the coils to the heat source (10), water circulating means (12, 25) and water transfer means (27) for the transfer of a part of the return water flow to the inlet side of the heating coils, flow volume in the separate coils being limited by means of valves (54, 54', 54", 62, 62', 62"), a mixing chamber (48), in the control and distributing unit (38) being connected to the heating coils (40, 40', 40") downstreams of the inlet chamber (44), a pipe (56) having a valve (64) being provided to feed return water to the mixing chamber (48) and valves (46, 46', 46") being provided to limit the inlet temperature in the respective coils (40, 40', 40") by controlling the flow to the mixing chamber (48).

In the present invention, contrary to the previously known technique, the control and regulation of the heat transfer is effectuated by regulation of the inlet temperature in each individual heating coil separately with the aid of simple and uncomplicated valves while a substantially constant flow through the individual heating coils is maintained. This is an entirely new technique which has not been possible to achieve with any of the previously known central heating installation systems.

An embodiment of the present invention will now be described, by way of example, with reference to the accompanying drawings, in which:

FIG. 1 is a circuit diagram of a central heating installation according to the invention including means for separate adjustment of flow and temperature respectively in floor heating coils.

FIG. 2 is a part of FIG. 1 showing in more detail means for adjusting flow and temperature as well as connecting pipes on an enlarged scale.

FIG. 1 illustrates generally a central heating installation according to the present invention including a heat source 10, e.g. a central heater. At the outlet of the heater there is a circulation pump 12 in a high temperature feed pipe 14, which leads to at least one floor heating circuit. Return water is brought back to the heater through a return pipe 16. In the feed pipe there is a check valve 18 for flow adjustment. From the feed pipe a by-pass pipe 20 is branched off for high temperature water to a three-way valve 22 on a low temperature return pipe 24 from the floor heating circuit. In pipe 24 there is a water return pump 25 and a check valve 26 for adjusting the circulating amount of water in the floor heating circuit. A water return transfer pipe 27 connects return pipe 24 and high temperature feed pipe 28. The water temperature in pipe 28 depends on the adjustment of three-way valve 22. The three-way valve comprises an adjustment means 30, which is monitored by a control unit 31, which is connected to an outdoor transmitter 32 and a transmitter 33 on pipe 28 for the feed pipe temperature.

In order to avoid a too low temperature of the return water to the heater and causing corrosion due to condensates, there is also a high temperature by-pass pipe 34 with a check valve 36. Pipe 34 is connected to low temperature return pipe 24, and the return pipe merges into high temperature return pipe 16. Thus, a desired temperature of the return water in the heater can be attained.

FIG. 2 illustrates in detail a portion of a central heating installation, an inlet control unit 38 being connected to a plurality of heating coils 40, 40', 40" and a collecting unit 42 for return water. Inlet control unit 38 comprises an inlet chamber 44, valves 46, 46', 46" for temperature limitation, a mixing chamber 48 and temperature transmitters 50, 50', 50". High temperature feed pipe 28 ends in inlet chamber 44. Tubes 52, 52', 52" for each heating coil lead from the inlet chamber to the corresponding temperature limitation valves 46, 46', 46". Each tube is provided with an inlet valve and the accompanying adjustment means 54, 54', 54". A pipe 56 for a portion of the return water ends in mixing chamber 48. An inlet tube 58, 58', 58" for each heating coil enters into the mixing chamber and is extended a certain distance into corresponding outgoing tube 60, 60', 60".

The separate coils 40, 40', 40" are divided up, from inlet control and distributing unit 38, into the separate rooms to be heated and are subsequently reunited in collecting unit 42. In collecting unit 42 return valves 62, 62', 62" are provided at the corresponding coil inlets. The return valves are used to adjust a volume flow in the separate coils. By means of the return valves different tube resistance in the coils can be compensated in order to provide the same flow in all the coils or different volume flows.

In pipe 56 for returning a portion of the return water to mixing chamber 48 there is a valve 64 for controlling the amount of the flow, which is returned to the mixing chamber. This valve preferably is a so-called "self-acting valve" and is spring-loaded and opens up with increasing inlet pressure. If that is the case, then the inlet pressure and the flow volume of the return water to the mixing chamber increase and consequently, the pressure difference between mixing chamber 48 and collecting unit 42 is kept mainly constant.

The use and the function of inlet control and distributing unit 38 is as follows. By means of temperature limitation valves 46, 46′, 46″ the flow through the respective valves is adjusted. These flows pass through inlet tubes 58, 58′, 58″ and out into outlet tubes 60, 60′, 60″. Due to the fact that the inlet tubes project into the outlet tubes there is practically no overflow to any adjacent outlet tube. Simultaneously, the return water is fed from mixing chamber 48 into the outlet tubes through gaps 61 between inlet tubes and outlet tubes. The feed water is cooled when it is mixed with the return water. The temperature of the separate outgoing coils can be read on thermometers 50, 50′, 50″. Consequently, by means of valves 46, 46′, 46″ the desired temperature in a respective coil can be obtained. When the installation parameters are kept constant, there is as a rule no need to alter this adjustment.

Inlet valves 54, 54′, 54″ in inlet chamber 44 cooperate with room temperature transmitters (not shown). They sense the temperature of the rooms, which are heated by the respective coil. When a room temperature transmitter senses a temperature, which rises above an adjusted desired value, a signal is sent to the adjustment means of the corresponding valve. The adjustment means then will shut off the valve and this is shown for valve 54″. When valve 54″ is shut, only return water having approximately the same total flow as the previous flow with valve 54″ open will flow into outlet tube 60″ of the mixing chamber. Consequently, the inlet temperature of coil 40″ will at least be roughly the same as the temperature of ingoing return water to the mixing chamber.

When inlet valve 54″ is shut, ingoing water in coil 40″ will be cooler than the adjacent floor material. This is particularly true in the first portion of the coil. The circulating water will then initially cool the floor material and consequently, the postheating capacity is lowered. Consequently, a certain heat exchange capacity may be attained, because heat is absorbed from the floor material. When the floor material has been cooled to the return temperature, which always is higher than the desired room temperature, the floor material will be maintained at this temperature. In this manner, a too extensive cooling of the floor material will be prevented. Consequently, the heating coil is able to quickly start heating the room again, when the corresponding cut-off valve opens up again.

When one or several of valves 54, 54′, 54″ are shut off, an increased resistance in the heater circuit is effected, namely return pipe 24, feed pipe 28, inlet chamber 44 with valves and the transfer pipes to mixing chamber 48. This results in an increased pressure and an increased return water flow in pipe 56. Self-acting valve 64 maintains a constant pressure difference between mixing chamber 48 and collecting unit 42 and thus, it will be possible, particularly when a self-acting valve is used, to maintain a roughly constant flow in the respective coil, regardless of whether the corresponding inlet valve is open or shut off.

In a test with three coils and a conventional and a self-acting valve 64 respectively, each being fixedly adjusted, the following outgoing flows ΣQ2 from collecting unit 42 have been recorded:

|  | Conventional Valve | Self-acting Valve |
| --- | --- | --- |
| All valves open | 100% | 100% |
| One valve closed | 95% | 100% |
| Two valves closed | 80% | 97% |
| Three valves closed | 40% | 94% |

In the two cases the same pump was used. Of course, a stronger pump will result in a smaller flow decrease than in the showed example. However, the smaller flows resulting with a conventional valve are also quite sufficient in order to prevent a total chilling of a floor having a floor heating coil as has been described above. However, an earlier test using a very strong checking of the inlet flow results in a chilling of the floor at the end of the coil.

In a central heating installation according to the present invention there is a feed pipe flow ΣQ1, having a temperature of T1, to inlet chamber 44. In mixing chamber 48 slightly cooler return water is added and this results in an outgoing flow ΣQ2 at temperature T2. T2 can be adjusted in the separate coils. Outgoing flow ΣQ2 from collecting chamber 42 is subdivided into a return water flow to the heater as well as to the feed pipe and a recirculated return water flow Q3 at temperature T3. The temperature may in this case decrease somewhat between collecting unit 42 and mixing chamber 48. Flow ΣQ1 preferably is about 60-70% of ΣQ2, when all valves 54 are open.

In an installation according to the invention the temperature control in the separate coils is effected in three steps. Initially, an adjustment of feed temperature T1 is effected by means of control unit 31 depending on the outdoor temperature according to an outdoor transmitter 32 and possibly also an indoor transmitter. In a second step a certain amount of recirculated water at temperature T3 is added by means of mixing chamber 48 and valves 46, 46′, 46″. In a third adjustment step ingoing feed water is shut off by means of valves 54, 54′, 54″, when a room temperature transmitter has recorded a too high temperature in a room unit heated by one of the respective coils. The inlet temperature of such a shut off coil will in this case be roughly the same as temperature T3 of the recirculated water.

The present invention is not limited to the shown embodiment but can be modified in an arbitrary manner within the frame as given by the following patent claims. The most important feature of the invention is the manner in which the heating circuit, consisting of several coils, is controlled by means of return of a return water flow from the common outlet of the coils to a mixing chamber. It is less important, in this regard, in which manner such a return is effected and in which manner hot water is fed from a heat source and is returned to that heat source. Several heating circuits each having their own inlet control and distributing unit 38 can e.g. be connected in parallel to the same heat source. The location of the return water pump can also vary and this pump can e.g. serve several heating circuits or be mounted in a separate direct pipe between the collecting unit and the mixing chamber.

We claim:

1. A method of regulating the flow and the temperature in a central heating installation, including a feed water pipe (14, 28) from a heat source (10), a heating circuit comprising a control and distributing unit (38)

having an inlet chamber (44) connected to the feed pipe and provided with a plurality of outlets, a plurality of heating coils (40, 40', 40") issuing from said inlet chamber by way of said outlets, a collecting unit (42) for said coils, a return water pipe (24, 16) for returning water from the coils to the heat source (10), water circulating means (12, 25), water transfer means (27) for transferring part of the return water flow to the inlet side of the heating coils (40, 40', 40"), flow volume in the separate coils being limited by means of valves (54, 54', 54", 62, 62', 62"), the improvement being that a portion of the return water is returned to a mixing chamber (48) positioned between the inlet chamber and the coils and the feed water flow for each individual coil (40, 40', 40") from each of said outlets (52, 52', 52") passes through said mixing chamber (48) where a portion of the return water mixes with the feed water for each individual coil, thus separately adjusting the inlet temperature for each individual coil (40, 40', 40") and maintaining at least an approximately constant flow through each coil.

2. A method according to claim 1, wherein water from the inlet chamber (44) via inlet tubes (58, 58', 58") is fed through the mixing chamber (48) into outlet tubes (60, 60', 60"), outgoing therefrom to the coils separately, the return water via the mixing chamber (48) entering gaps (61) between the inlet tubes and the outlet tubes also then being fed into the separate coils (40 40', 40").

3. A method according to claim 1 wherein the inlet temperatures of the respective coils (40, 40', 40") are sensed by means of temperature transmitters (50, 50', 50") and in that maximum inlet temperatures are adjusted by volume flow control of water coming from the respective inlet tubes (58, 58', 58") by means of valves (46, 46', 46").

4. A method according to claim 1, wherein the temperature of the rooms, which are heated by the respective coils (40, 40', 40"), is sensed and in that the flow to the corresponding coils is shut off by means of an inlet valve having adjustment means (54, 54', 54"), the result being that only return water will circulate in the coil, when the sensed temperature is higher than a predetermined upper desired value, and in that the flow is permitted again, when the sensed temperature is lower than a predetermined lower desired value, in order to keep the room temperature substantially constant.

5. Apparatus for regulating the flow and the temperature in a central heating installation comprising a feed water pipe (14, 28) from a heat source (10), a heating circuit comprising a control and distributing unit (38) having an inlet chamber (44) connected to the feed pipe and provided with a plurality of outlets, a plurality of heating coils (40, 40', 40") issuing from said inlet chamber by way of said outlets, a collecting unit (42) for said coils, a return water pipe (24, 16) for returning water from the coils to the heat source (10), water circulating means (12, 25), water transfer means (21) for transferring part of the return water flow to the inlet side of the heating coils, and flow volume in the separate coils being limited by means of valves (54, 54', 54", 62, 62', 62"), characterized in that a mixing chamber (48), in the control and distributing unit (38), being connected between said outlets (52, 52', 52") from said inlet chamber (44) and said heating coils (40, 40', 40"), a pipe (56) having a valve (64) being provided to feed return water to said mixing chamber (48) and valves (46, 46', 46") being provided in said outlets between said inlet chamber (44) and said mixing chamber (48) to limit the inlet temperature in the respective coils (40, 40', 40") by controlling the flow of feed water to said mixing chamber (48).

6. Apparatus according to claim 5, valve (64) is a "self-acting valve", which when subjected to a larger inlet pressure allows a large flow to pass and consequently keeps the pressure difference across the floor heating coils substantially constant.

7. Apparatus according to claim 5, comprising valves having adjustment means (54, 54', 54") to shut off the water to the respective coils (40, 40', 40") in response to room temperatures in the rooms heated by the respective coils.

8. Apparatus according to claim 5 wherein the mixing chamber is provided with inlet tubes (58, 58', 58"), projecting through the mixing chamber into outlet tubes (60, 60', 60") outgoing from the mixing chamber to the respective coils (40, 40', 40") the outer diameter of the inlet tubes being smaller than the inner diameter of the outlet tubes and the inlet tubes projecting into the outlet tubes a certain distance with an intermediate gap (61) designed to allow return water to pass into the respective outlet tubes and their corresponding coils (40, 40', 40").

9. A method according to claim 1, characterized in, that the flow volume in each individual coil (40, 40', 40") is controlled by an adjustment of the valves (62, 62', 62") at the outlet end of each respective coil (40, 40', 40").

10. A method according to claim 1, characterized in that the return water flow to the mixing chamber is regulated by an adjustment of a valve (64) in the water transfer means (27) in order to keep the flow in each individual coil (40, 40', 40") substantially constant, regardless of whether the corresponding inlet valve (54, 54', 54") is open or closed.

* * * * *